United States Patent [19]

Gast, Jr.

[11] Patent Number: 5,649,995
[45] Date of Patent: Jul. 22, 1997

[54] NITROGEN GENERATION CONTROL SYSTEMS AND METHODS FOR CONTROLLING OXYGEN CONTENT IN CONTAINERS FOR PERISHABLE GOODS

[75] Inventor: William A. Gast, Jr., Spokane, Wash.

[73] Assignee: Nitec, Inc., Spokane, Wash.

[21] Appl. No.: 401,367

[22] Filed: Mar. 9, 1995

[51] Int. Cl.$^6$ .................................................. B01D 53/22
[52] U.S. Cl. .......................... 95/12; 95/54; 96/8; 96/10; 55/218; 426/419
[58] Field of Search ........................ 95/8, 12, 45, 54; 96/4, 7, 8, 10; 426/418, 419

[56] References Cited

U.S. PATENT DOCUMENTS

| | | | |
|---|---|---|---|
| 3,239,360 | 3/1966 | Dixon | 426/419 |
| 4,454,723 | 6/1984 | Wessel, Jr. | 62/64 |
| 4,566,282 | 1/1986 | Knoblauch et al. | 426/419 X |
| 4,681,602 | 7/1987 | Glenn et al. | 95/54 X |
| 4,716,739 | 1/1988 | Harris et al. | 62/78 |
| 4,781,907 | 11/1988 | McNeill | 95/54 X |
| 4,817,391 | 4/1989 | Roe et al. | 426/419 X |
| 4,829,774 | 5/1989 | Wassibauer et al. | 426/419 X |
| 4,881,953 | 11/1989 | Prasad et al. | 95/54 X |
| 4,961,322 | 10/1990 | Oguma et al. | 426/419 X |
| 4,987,745 | 1/1991 | Harris | 426/419 X |
| 5,053,058 | 10/1991 | Mitariten | 95/8 |
| 5,063,753 | 11/1991 | Woodruff | 426/419 X |
| 5,120,329 | 6/1992 | Sauer et al. | 426/419 X |
| 5,127,233 | 7/1992 | Coffield | 426/419 X |
| 5,152,966 | 10/1992 | Roe et al. | 426/418 X |
| 5,172,558 | 12/1992 | Wassibauer et al. | 62/78 |
| 5,249,428 | 10/1993 | Barbe et al. | 426/419 X |
| 5,281,253 | 1/1994 | Thompson | 95/45 X |
| 5,290,341 | 3/1994 | Barbe | 95/54 |
| 5,302,189 | 4/1994 | Barbe et al. | 95/54 |
| 5,308,382 | 5/1994 | Prasad | 426/418 X |
| 5,332,547 | 7/1994 | Olson et al. | 426/419 X |
| 5,333,394 | 8/1994 | Herdeman et al. | 34/467 |
| 5,342,637 | 8/1994 | Kusters et al. | 426/419 X |
| 5,355,781 | 10/1994 | Liston et al. | 426/419 X |
| 5,388,413 | 2/1995 | Major et al. | 95/54 X |
| 5,438,841 | 8/1995 | Cahill-O'Brien et al. | 426/418 X |
| 5,451,248 | 9/1995 | Sadkowski et al. | 426/419 X |
| 5,457,963 | 10/1995 | Cahill-O'Brien et al. | 426/419 X |
| 5,470,379 | 11/1995 | Garrett | 95/12 X |

FOREIGN PATENT DOCUMENTS

| | | | |
|---|---|---|---|
| 0363553 | 4/1990 | European Pat. Off. | 426/419 |
| 0409545 | 1/1991 | European Pat. Off. | 95/12 |
| 60-014924 | 1/1985 | Japan | 96/4 |
| 1-065008 | 3/1989 | Japan | 95/12 |
| 1558446 | 4/1990 | U.S.S.R. | 95/8 |

*Primary Examiner*—Robert Spitzer
*Attorney, Agent, or Firm*—Lee & Hayes

[57] ABSTRACT

A nitrogen generation control system and method are provided for controlling levels of nitrogen and oxygen in a controlled atmosphere within a container for perishable goods. The nitrogen generation control system has a nitrogen generator that controllably generates an amount of nitrogen, while releasing oxygen as an off gas. The nitrogen is injected into the container to create a controlled environment. A sample analyzer subsystem is connected to the container to extract a sample of gases from the controlled environment and analyze the oxygen content. The control system further includes a cascaded, dual control loop controller coupled to the nitrogen generator and sample analyzer subsystem. The controller has a nitrogen generation control loop to control the amount of nitrogen generated by the nitrogen generator in response to variation between the oxygen released during nitrogen generation and a reference amount of oxygen. The controller also has a container atmosphere control loop to control the reference amount of oxygen used as a control input to the nitrogen generation control loop in response to variation between the actual oxygen content in the container and a preselected oxygen level desired to be present in the container.

16 Claims, 5 Drawing Sheets

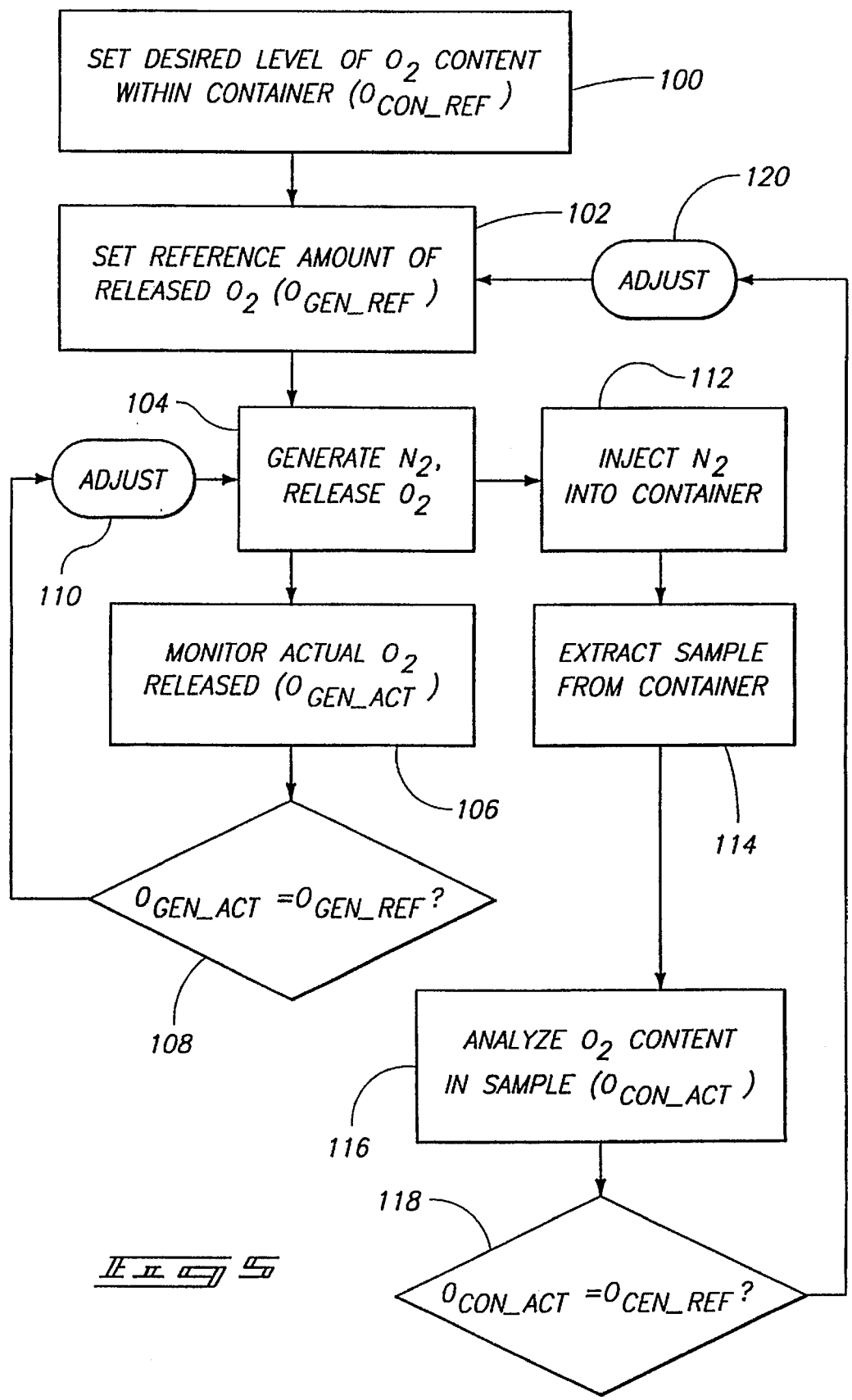

NITROGEN GENERATION CONTROL SYSTEMS AND METHODS FOR CONTROLLING OXYGEN CONTENT IN CONTAINERS FOR PERISHABLE GOODS

TECHNICAL FIELD

This invention relates to nitrogen generation control systems and methods for controlling the oxygen content in containers for fruit, vegetables, and other perishable goods. This invention further relates to controlled atmosphere apparatuses consisting of such control systems mounted on containers.

BACKGROUND OF THE INVENTION

In the present era of world trade and managed distribution, consumers enjoy a wide assortment of fresh produce at their local grocery stores throughout the year. The fresh produce includes fruits and vegetables that are in season and out of season, harvested locally and grown overseas. At a given time of the year, a store in Omaha, Nebr. might have in stock apples from New Zealand, bananas from Costa Rica, pineapples from the Maui, lettuce from California, and corn from neighboring Nebraska counties. The convenience of year round produce is accomplished by sophisticated planning and distribution networks which take unripened produce directly from harvest, timely ripen it, and then transport the produce to stores for sale at the height of its ripeness and freshness.

It is well known that certain perishable produce can be maintained in fresher condition at refrigerated temperatures above freezing. Controlled atmospheres which inhibit rapid ripening and spoilage are also used to enhance freshness. It is therefore common to store and ship produce in refrigerated and/or controlled atmosphere structures to maintain the freshness, particularly in view of the large distances and long time spans often required for shipping, importation, and distribution.

Common controlled atmospheres are created within shipping or storage facilities by periodically flushing the enclosed environment with an inert gas, such as nitrogen. Due to the presence of the predominate inert gas, the controlled atmosphere has a small quantity of oxygen, thereby slowing the ripening process of the produce.

Consider the trek of bananas, a representative imported fresh produce, from harvest to point of purchase. The bananas are harvested from trees in tropical habitats (such as Costa Rica) in an unripened condition. The bananas are placed on a large cargo ship and transported to a port in the United States, such as Los Angeles or Tampa Bay. The cargo ship has special chambers with controlled atmospheres designed to prevent the bananas from ripening. Once in the U.S., the bananas are stored temporarily in large controlled atmosphere warehouses during importation procedures. The bananas are then transferred to a truck trailer that is also specially designed to maintain a controlled atmosphere which inhibits ripening of the bananas. The bananas are ported in the truck trailer to another warehouse facility for ripening.

The ripening facility provides an environment for controllably ripening the bananas. The environment is primarily comprised of nitrogen, with small parts of oxygen. To ripen the bananas, ethylene $C_2H_4$ is introduced into the controlled atmosphere. During ripening, the bananas absorb oxygen and simultaneously release carbon dioxide $CO_2$, a process known as "respiration". When the bananas are just about ripe, they are loaded back onto refrigerated truck trailers and distributed to the grocery stores for sale. The bananas are ripe, or slightly unripe, by the time they are displayed in the grocery stores.

Example refrigerated and/or controlled atmosphere systems and containers are described in the following patents. U.S. Pat. No. 4,716,739 describes a system that initially flushes its container with a nitrogen gas to reduce the oxygen level to a base amount, and thereafter controls oxygen levels within the container by selected inflow of ambient air. U.S. Pat. No. 5,333,394 discloses a controlled atmosphere system that manages atmospheric conditions within multiple, gas tight, interchangeable container modules. U.S. Pat. No. 4,961,332 discloses a food storing device having a cooling mechanism, a supply of nitrogen for controlling levels of oxygen within the storage device, and a lamp to facilitate photosynthesis.

Prior art portable controlled atmosphere systems typically have a limitation in that they maintain the controlled atmosphere according to a chosen setting. For instance, U.S. Pat. No. 3,239,360 describes periodically purging a container with nitrogen gas in response to oxygen levels within the container to maintain a specified oxygen content. The controller in the '360 patent maintains the oxygen levels within the container at a fixed set point between ½% and 4% by volume. Unfortunately, fresh produce changes during transportation due to numerous parameters such as varying respiration rates, temperature, and transportation time. As a result, the prescribed oxygen levels suitable for maintaining the desired environment might change at various stages of the trip.

Furthermore, there has yet to be developed a workable portable container that controllably ripens fruit during transportation. The ripening process causes certain fruits and vegetables to release large amounts of heat at a rapid pace. The refrigeration system on prior art portable containers are incapable of managing the heat and the produce prematurely spoils in route. Thus, the fruit is typically ripened in large warehouse ripening facilities which have large refrigeration systems to accommodate the heat released during ripening. Thereafter, the fruit is loaded back onto a refrigerated, controlled atmosphere truck for regional distribution.

It would be desirable to provide a portable controlled atmosphere system that adapts to the evolving climate within the controlled produce environment. It would further be beneficial if the portable controlled atmosphere system could be configured to inhibit ripening, promote controlled ripening during transportation, or a combination of both. Such a system would decrease distribution costs by reducing or eliminating use of warehouse ripening facilities.

BRIEF DESCRIPTION OF THE DRAWINGS

Preferred embodiments of the invention are described below with reference to the following accompanying drawings.

FIG. 5 is a flow diagram of preferred steps for a method for controlling nitrogen content in a controlled environment according to another aspect of this invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts". U.S. Constitution, Article 1, Section 8.

Figure 1:
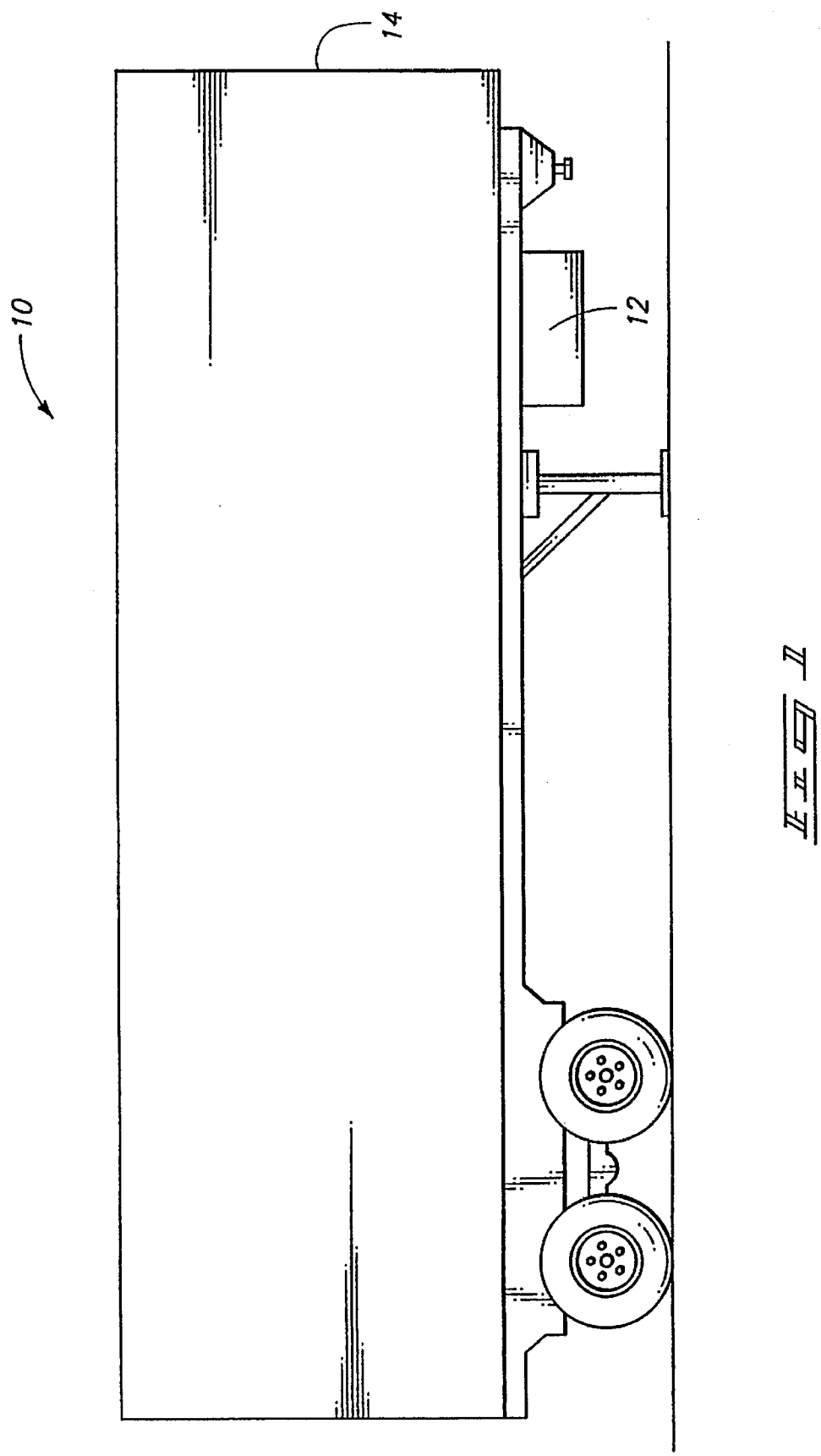
FIG. 1 is a side elevation view of a nitrogen generation control system mounted to a truck trailer according to one aspect of this invention.

FIG. 1 shows a controlled atmosphere system 10 according to one aspect of this invention. The controlled atmosphere system 10 has a nitrogen generation control system 12 mounted to a container 14 in the form of a truck trailer. The container 14 may be provided in a variety of shapes, sizes, and constructions suitable to hold or carry fresh produce, chemicals, or other perishable goods. The container is shown for explanation purposes as a portable truck trailer suitable for transporting perishable goods from storage facilities to retailers. Other forms of container 14 include storage warehouses, cargo holds in ships, airplane, delivery trucks, portable crates, and the like. One example construction of a modular container structure is shown in U.S. Pat. No. 5,333,394, which is hereby incorporated by reference.

Truck trailer 14 is specially constructed to promote creation of a controllable environment therein that can be used in the transportation of fresh produce, chemicals, or other perishable products. The truck trailer might be hermetically sealed, or contain venting means for exhausting gases. The truck trailer might also be equipped with a refrigeration system (not shown) to maintain a lower internal temperature.

For purposes of continuing discussion, aspects of this invention will be described primarily in the context of containers used to carry fresh produce, such as bananas or pineapples.

In the illustrated embodiment, the nitrogen generation control system 12 is mounted underneath truck trailer 14 between two structural I-beams. The nitrogen generation control system is coupled via hoses or tubes (not shown in this Figure) to supply high purity nitrogen into the truck trailer. The internal atmosphere can be controlled via control system 12 to inhibit ripening, or to promote gradual ripening that is timed to coincide with delivery of the produce to grocery stores. Produce ripens in an oxygen rich environment. Fruit and vegetables utilize available oxygen and release carbon dioxide in a cycle known as "respiration". The rate of respiration can fluctuate widely, and is greatly affected by temperatures and oxygen levels in the atmosphere surrounding the produce. It is therefore desirable to maintain a controlled atmosphere that has small, prescribed levels of oxygen. The customary practice in the fresh produce industry is to purge the atmosphere periodically with an inert gas, such as nitrogen. U.S. Pat. No. 3,239,360 describes this technique of purging the produce atmosphere with nitrogen gas.

An environment with a high nitrogen content significantly slows or halts respiration and the ripening process. One example controlled atmosphere consists predominantly of nitrogen gas (e.g., 91%–98%), a small portion of oxygen (e.g., 1%–8%), and traces of other gases, such as carbon dioxide $CO_2$. As other examples, U.S. Pat. No. 4,454,723, suggests maintaining an oxygen level between about 1% and 5%, and U.S. Pat. No. 3,239,360 prescribes an oxygen level of approximately ½% to 4%.

Figure 2:
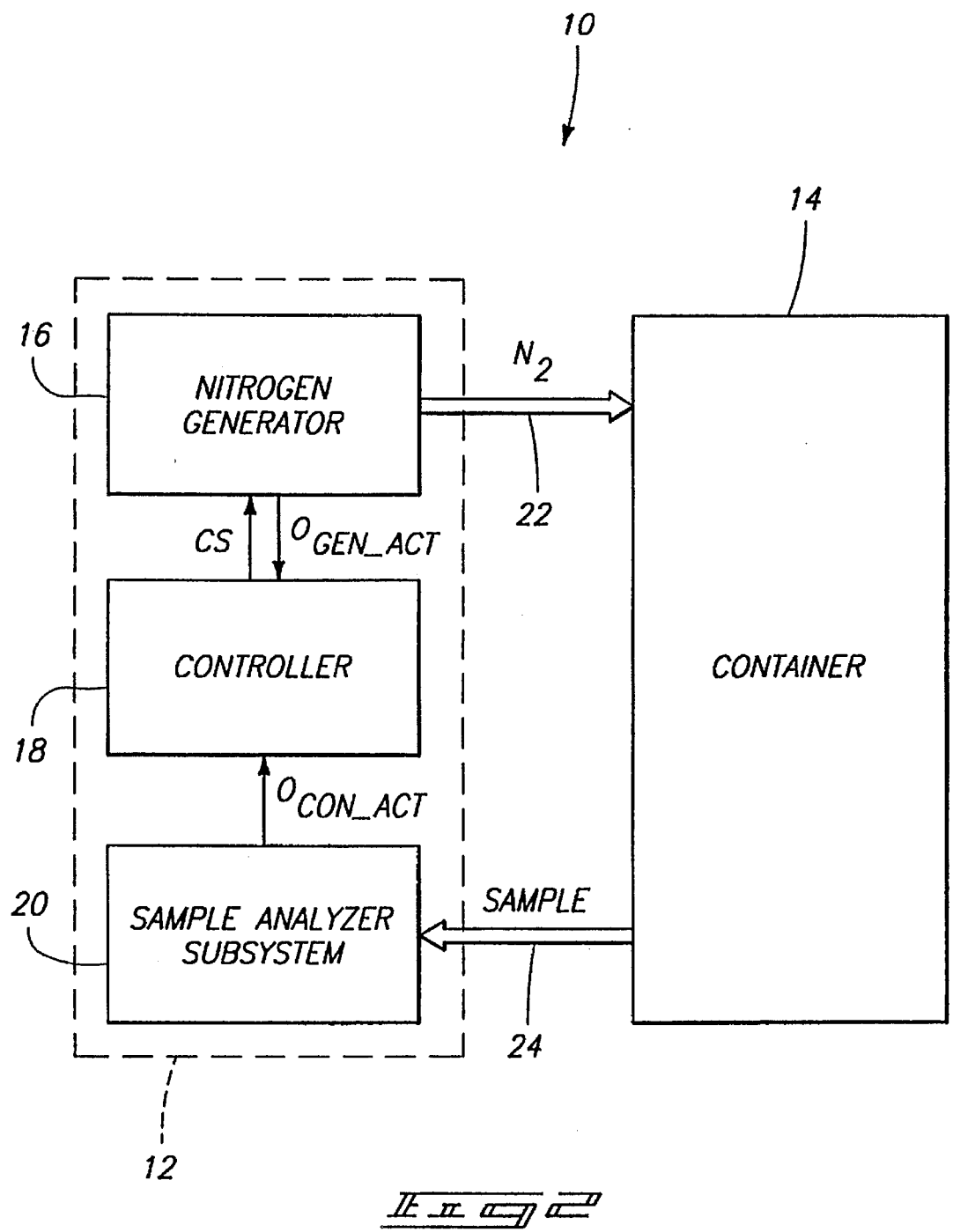
FIG. 2 is a block diagram of the nitrogen generation control system.

FIG. 2 shows a high level block diagram of controlled atmosphere system 10. Nitrogen generation control system 12 has a nitrogen generator 16, a controller 18, and a sample analyzer subsystem 20. Nitrogen generator 16 controllably generates a quantity of high purity nitrogen $N_2$ that is injected via hose 22 into the controlled environment within container 14 (such as the truck trailer of FIG. 1). The nitrogen generator releases oxygen as an off gas during the nitrogen generation process. This generator-produced oxygen is sensed and measured, and a value indicative of the oxygen amount, designated as $O_{GEN\_ACT}$, is input to controller 18.

Sample analyzer subsystem 20 is connected via hose 24 to container 14. Sample analyzer subsystem 20 extracts samples of the gases contained in the controlled environment. The sample includes nitrogen, oxygen, carbon dioxide, and traces of other gases. The sample analyzer subsystem 20 determines the actual oxygen content of the sample, which is representative of the oxygen content in the container. A value indicative of the oxygen content within the container, designated as $O_{CON\_ACT}$, is input to controller 18.

Controller 18 is coupled to the nitrogen generator 16 and the sample analyzer subsystem 20. Controller 18 outputs a control signal CS which causes the nitrogen generator 16 to change the amount or purity of nitrogen that it generates in response to variation between the oxygen released during nitrogen generation and a reference amount of oxygen. The controller further changes the set point or reference amount of oxygen used for controlling nitrogen generation in response to variation between the actual oxygen content measured in the container and a preselected oxygen level that is desired to be present in the container.

Figure 3:
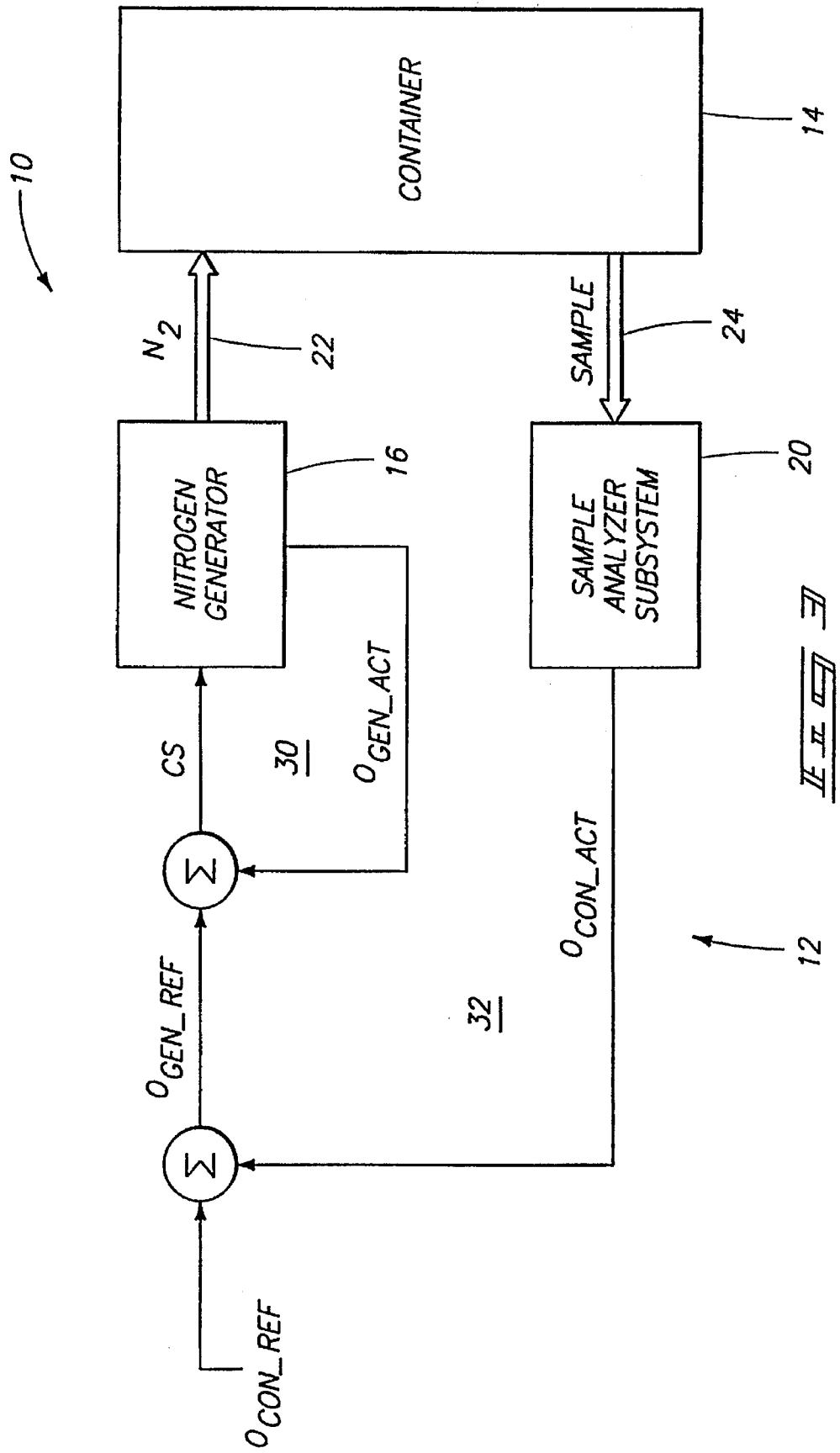
FIG. 3 is a block diagram of a cascaded, dual loop controller used in the nitrogen generation control system.

FIG. 3 shows the control operation of nitrogen generation control system 12 in more detail. The nitrogen generation control system employs a unique cascaded, double control loop controller. The first, nitrogen generation control loop, referenced generally by numeral 30, provides control of the nitrogen generation based upon differences between the actual oxygen released by the nitrogen generator $O_{GEN\_ACT}$ and a reference amount of oxygen $O_{GEN\_REF}$. The nitrogen generation control loop 30 is configured to maintain a consistent output level of nitrogen. It is noted that if the respiration of the produce in its environment was constant, the nitrogen generation control loop 30 would be sufficient to maintain the desired controlled atmosphere within the container. However, respiration rates vary based on a number of factors, including produce variety, temperature, container type, atmospheric composition, and the like. Accordingly, this single control loop by itself is not sufficiently effective to provide optimal control over the internal container atmosphere, especially if it is desired to controllably change the atmosphere over time to promote ripening.

This invention therefore provides a second, container atmosphere control loop, referenced generally by numeral 32, which manipulates the reference amount of oxygen $O_{GEN\_REF}$ that is used by the nitrogen generation control loop 30 to control the quantity and purity of nitrogen injected into the container. The reference amount of oxygen $O_{GEN\_REF}$ is adjusted based upon differences between the actual oxygen level $O_{CON\_ACT}$ measured in the container by sample analyzer subsystem 20 and a preselected reference level of oxygen $O_{CON\_REF}$ that should be present in the container in order to maintain the desired atmosphere.

According to the control of this invention, the nitrogen generation control system 12 can maintain a nitrogen rich, ripening-inhibiting environment that contains very little oxygen. Alternatively, the nitrogen generation control system 12 can facilitate a ripening process within the container by controlling the level of oxygen within the container according to various parameters, such as prescribed oxygen levels at various stages of ripening, type of produce, temperature, container type, transportation time, and other factors. The controller 18 includes memory (both volatile and non-volatile), an input device (such as a keypad), and display screen which permits the user to program the desired ripening schedule, or the levels of oxygen to be present at any given time to carry out the ripening, or other parameters.

The controlled atmosphere system of this invention therefore provides tremendous flexibility and advantages over prior art systems. For instance, assume that a produce company wants to transport bananas from Los Angeles to Omaha. Further assume that the company wants to controllably ripen the bananas in route by controllably increasing the oxygen level in the container. During the trip, ethylene ($C_2H_4$) is introduced into the container to initiate the ripening process. Initially, the oxygen level is kept relatively low (e.g., 1%–2%). As the ripening continues, however, the oxygen level is gradually increased. This is accomplished via the cascaded, dual control loop whereby the container atmosphere control loop 32 monitors the oxygen content in the container, compares it to a desired reference oxygen content suitable for that stage of the ripening process, and derives an oxygen set point for the nitrogen generation control loop 30. The nitrogen generation control loop 30 then controls the nitrogen production, which effectively controls the oxygen level in container 14, in accordance with the changed oxygen set point. By the time the bananas reach Omaha, they are ripe or near ripe and ready for immediate unloading from container 14 and display at the local grocery store.

The controlled atmosphere system 10 of this invention can thereby eliminate the intermediate step of storing the bananas in a storage and ripening warehouse prior to redistribution to local grocery stores. Prior art systems are incapable of achieving this simultaneous shipping and controlled ripening. Further, the use of regional stand-alone ripening facilities can be reduced or eliminated, thereby saving tremendous operating costs in product distribution.

Figure 4:
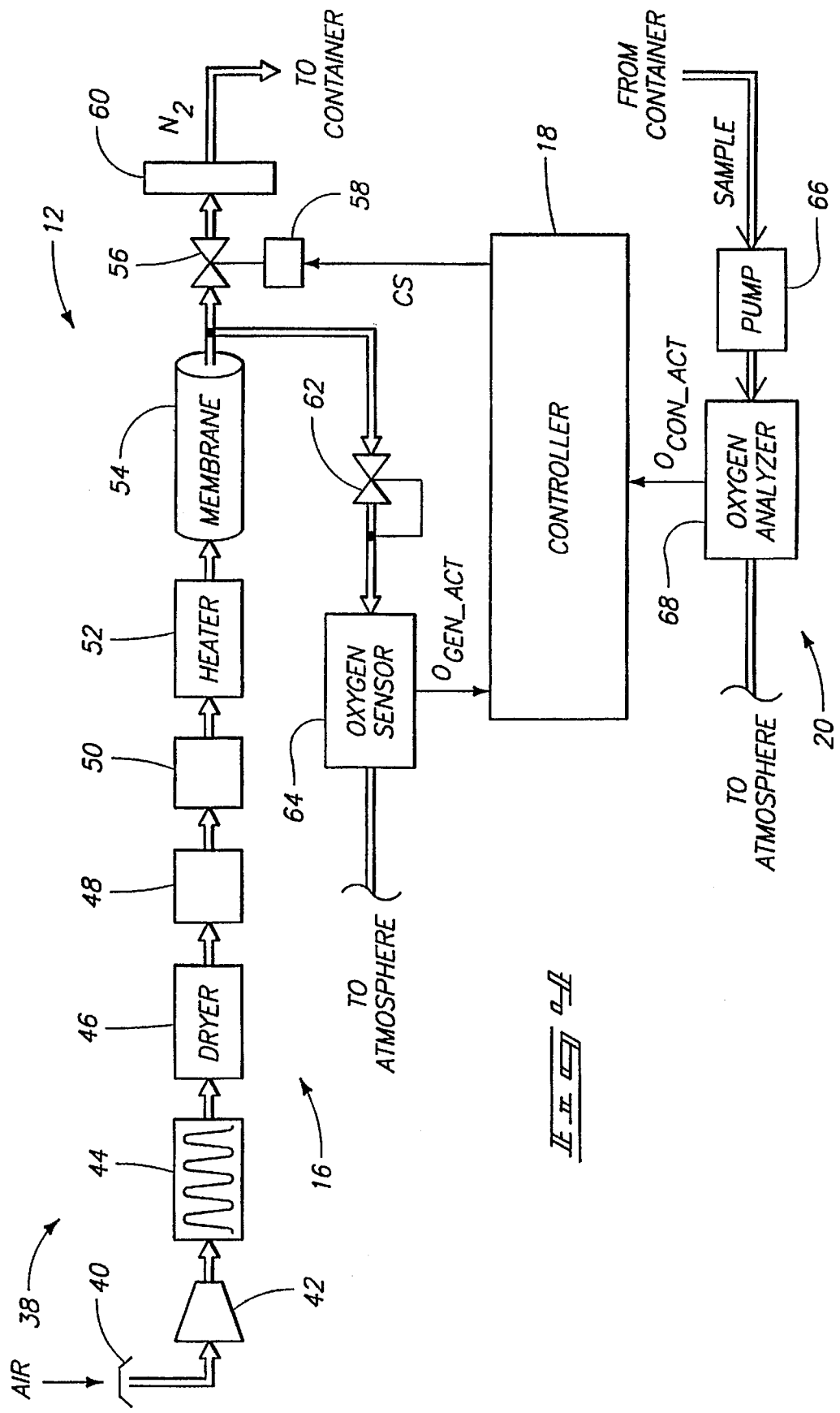
FIG. 4 is a block diagram of one preferred implementation of the nitrogen generation control system according to this invention.

FIG. 4 shows one preferred implementation of a nitrogen generation control system 12 according to an aspect of this invention. The nitrogen generator 16 includes an air intake subsystem 38 which draws in air from external atmosphere to provide a source air stream that is passed through nitrogen generating membrane 54. Air primarily consists of nitrogen and oxygen, at about a 4:1 ratio in volume, with small traces of argon (e.g. 0.9 percent), carbon dioxide (e.g., 0.03 percent), and water vapor, and even more minute quantities of helium, krypton, neon, and xenon. In the illustrated embodiment, air intake subsystem 38 includes a filter 40 which filters large particles of matter from the air. The air stream is passed through a compressor 42 which condenses the air to a higher pressure, an after cooler 44 to cool the condensed air stream, and a refrigerated air dryer 46. Air intake subsystem 38 further includes a carbon filter 48 to remove any carbon component in the air stream and a particulate filter 50 to extract particulate matter. Heater 52 is then used to heat the air stream, thereby further increasing air stream pressure.

The air stream is then passed through a nitrogen generating membrane 54 which produces a stream of high purity nitrogen. The nitrogen generating membrane is of the type that releases oxygen as an off gas during generation of the nitrogen. Water vapor, and other gas forms, are also released. A nitrogen generating membrane of this type is manufactured by Dow Chemical, Inc. under the trademark GENERON 4100 ™.

In general, the purity of the nitrogen stream output from the nitrogen generating membrane 54 is a function of the amount of time that the air stream contacts the membrane walls. A valve 56 downstream of the membrane is used to control the flow rate of the air stream through the nitrogen generating membrane 54. As the valve is opened, the flow rate is increased and less oxygen is extracted from the air stream as it flows through the membrane. The nitrogen stream is comparatively less pure. Conversely, as the valve 56 is closed, the flow rate is decreased and more oxygen is extracted from the air stream as it flows through the membrane. The nitrogen stream is thus comparatively more pure.

The nitrogen generating membrane essentially produces a nitrogen stream whose purity is proportional to the amount of oxygen removed by the membrane, which in turn is controlled by the valve setting. The valve is controlled by a valve actuator 58 which is responsive to the control signal CS from controller 18, as will be described in more detail below. The nitrogen stream is thereafter passed through a heater 60 and injected into the container.

The nitrogen stream output by membrane 54 is also channeled through a reduction member 62 and into an oxygen sensor 64. Oxygen sensor 64 senses the quantity of oxygen released from the membrane. Oxygen sensor 64 outputs a value $O_{GEN\_ACT}$ indicative of the actual amount of oxygen released by the nitrogen generating membrane. The control value $O_{GEN\_ACT}$ is input to controller 18 and used to derive a control signal CS that manages the actuator/membrane component. The oxygen monitored by sensor 64 is subsequently exhausted to the external atmosphere.

With respect to the sample analyzer subsystem 20, a pump 66 is provided to draw a sample of gases from the container. An oxygen analyzer 68 is connected to pump 66 to measure the actual oxygen content of the gases within the extracted sample. Oxygen analyzer 68 outputs a signal $O_{CON\_ACT}$ indicative of the actual oxygen content within the container. The gases are thereafter exhausted to the external atmosphere.

As described above with respect to FIG. 3, the controller 18 uses the actual oxygen content value in the container, $O_{CON\_ACT}$, to derive a controllably adjustable set point used to control the nitrogen generation. More particularly, the control signal CS is generated based upon the difference between a reference amount of oxygen desired to be released by the membrane 54 (i.e., $O_{GEN\_REF}$) and the oxygen amount actually released (i.e., $O_{GEN\_ACT}$). The reference amount in turn is controllably varied in response to the difference between a preselected oxygen content level desired within the container (i.e., $O_{CON\_REF}$) and the actual oxygen content level (i.e., $O_{CON\_ACT}$).

FIG. 5 illustrates a method for controlling a level of oxygen in a controlled environment. At step 100, the desired level of oxygen to be present within the controlled environment, $O_{CON\_REF}$, is set. This value can be set to a level that inhibits ripening or according to a ripening schedule that accommodates many factors, including temperature, degree of ripening, changing respiration, container type, and so on. The reference amount of oxygen to be released by membrane 54 during generation of the nitrogen, or $O_{GEN\_REF}$, is also initially set (step 102). Both reference values can be maintained in memory within the controller 18. At step 104, nitrogen is generated by membrane 54, which simultaneously releases oxygen $O_2$. The actual amount of oxygen released, $O_{GEN\_ACT}$, is measured by oxygen sensor 64 (step 106). The actual released oxygen $O_{GEN\_ACT}$ is compared with the reference value $O_{GEN\_REF}$ (step 108). If the two values differ, an adjustment or correction factor is computed at step 110 and returned to block 104 to alter the amount of nitrogen being generated. Steps 104–110 provide a first continuous cycle of nitrogen generation, monitoring, comparison, and correction.

The nitrogen generated at step 104 is injected into the container (step 112). A sample of gases from the controlled environment within the container is extracted (step 114) and the actual oxygen content of the sample, $O_{CON\_ACT}$, is analyzed (step 116). The actual oxygen content $O_{CON\_ACT}$ is compared with the reference level $O_{CON\_REF}$ (step 118). If the two values differ, an adjustment or correction factor is computed at step 120 to change the reference amount of the released oxygen $O_{GEN\_REF}$ used in the control of the nitrogen generation. Steps 112–120 provide a second continuous cycle of monitoring oxygen content within the container and adjusting nitrogen generation based thereon. This second loop is performed concurrently with the first cycle of steps 104–110.

This invention is advantageous because it provides a flexible system and method that effectively manage an evolving controlled atmosphere that changes and adapts with the fresh produce. The cascaded, dual control loop system can facilitate either a ripening inhibiting environment or a controllable ripening environment within a portable container, such as a truck trailer, even though the parameters (i.e., respiration rate, temperature, transportation distance, produce type, etc.) changes from load to load.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method for controlling a level of oxygen in a controlled environment, the controlled environment comprising gases which include nitrogen and oxygen, the method comprising the following steps:

providing a desired level of oxygen within the controlled environment;

controllably generating a stream of nitrogen having an oxygen component;

controllably setting a reference amount of oxygen to be present in the nitrogen stream;

monitoring the amount of oxygen that is actually present in the nitrogen stream;

adjusting the amount of nitrogen being generated based upon variation between the monitored amount of oxygen and the reference amount of oxygen;

injecting the nitrogen into the controlled environment;

extracting a sample of gases from the controlled environment;

analyzing actual oxygen content in the extracted sample; and adjusting the reference amount of oxygen to be present in the nitrogen stream based upon variation between the actual oxygen content in the controlled environment and the desired level of oxygen in the controlled environment.

2. A method according to claim 1 wherein the step of controllably generating nitrogen comprises passing, at controllable flow rates, an air stream through a nitrogen generating membrane which produces a stream of high purity nitrogen.

3. A nitrogen generation control system for controlling levels of nitrogen and oxygen in a controlled environment for perishable goods, the nitrogen generation control system comprising:

a nitrogen generator to controllably generate a stream of nitrogen, the nitrogen stream having an oxygen component, the nitrogen generator being connected to inject the nitrogen stream into the controlled environment;

a sample analyzer subsystem connected to extract a sample of gases from the controlled environment and analyze an actual oxygen content in the extracted sample; and a controller coupled to the nitrogen generator and sample analyzer subsystem, the controller causing the nitrogen generator to change the amount of nitrogen being generated in response to variation between the oxygen component in the nitrogen stream and a reference amount of oxygen, the controller further changing the reference amount of oxygen used for controlling nitrogen generation in response to variation between the actual oxygen content in the container and a preselected oxygen level desired to be present in the container.

4. A nitrogen generation control system according to claim 3 wherein the nitrogen generator comprises a nitrogen generating membrane.

5. A nitrogen generation control system according to claim 3 wherein the nitrogen generator comprises:

a nitrogen generating membrane that generates a stream of high purity nitrogen with varying quantities of oxygen; and an oxygen sensor operably connected to the nitrogen generating membrane to sense the quantity of oxygen in the nitrogen stream.

6. A nitrogen generation control system according to claim 3 wherein the nitrogen generator comprises:

an air intake subsystem which draws in air from external atmosphere to provide an air stream;

a nitrogen generating membrane connected to the air intake subsystem to receive the air stream, the nitrogen generating membrane outputting a stream of high purity nitrogen with varying quantities of oxygen;

an actuator operably connected to control flow rate of the air stream through the nitrogen generating membrane so that for a slower flow rate of the air stream therethrough, a higher purity nitrogen stream with a lower quantity of oxygen is output and for a faster flow rate of the air stream therethrough, a lower purity nitrogen stream with a higher quantity of oxygen is output; and an oxygen sensor operably connected to the nitrogen generating membrane to sense the quantity of oxygen in the nitrogen stream.

7. A nitrogen generation control system for controlling a level of oxygen in a controlled environment, the controlled environment comprising gases which include nitrogen and oxygen, the system comprising:

a nitrogen generating membrane to generate a stream of high purity nitrogen for injection into the controlled environment, the nitrogen stream having varying quantities of oxygen;

an actuator operably connected to the nitrogen generating membrane to control the purity of the nitrogen stream, thereby effectively controlling the quantity of oxygen in the nitrogen stream;

an oxygen sensor operably connected to the nitrogen generating membrane to sense the quantity of oxygen in the nitrogen stream;

an oxygen analyzer to measure an actual oxygen content of the gases within the controlled environment; and a controller coupled to the actuator, the oxygen sensor, and the oxygen analyzer, the controller causing the actuator to change the purity of the nitrogen stream in response to variation between the quantity of oxygen in the nitrogen stream and a reference amount of oxygen, the controller further changing the reference amount of oxygen used for controlling nitrogen purity in response to variation between the actual oxygen content measured by the oxygen analyzer and a preselected oxygen level.

8. A nitrogen generation control system according to claim 7 wherein:

the nitrogen generating membrane produces high purity nitrogen from an air stream which is passed therethrough; and the actuator is configured to control flow rate of the air stream through the nitrogen generating membrane so that for a slower flow rate of the air stream therethrough, a higher purity nitrogen stream with a lower quantity of oxygen is output and for a faster flow rate of the air stream therethrough, a lower purity nitrogen stream with a higher quantity of oxygen is output.

9. A nitrogen generation control system for controlling levels of nitrogen and oxygen in a controlled atmosphere within a container for perishable goods, the nitrogen generation control system comprising:

a nitrogen generator to controllably generate a stream of nitrogen, the nitrogen stream having an oxygen component, the nitrogen generator being connected to inject the nitrogen stream into the container;

a sample analyzer subsystem connected to extract a sample of gases from the controlled atmosphere and analyze an actual oxygen content in the extracted sample; and a cascaded, dual control loop controller coupled to the nitrogen generator and sample analyzer subsystem, the controller having a nitrogen generation control loop to control the amount of nitrogen generated by the nitrogen generator in response to variation between the oxygen component in the nitrogen stream and a reference amount of oxygen, the controller also having a container atmosphere control loop to control the reference amount of oxygen used as a control input to the nitrogen generation control loop in response to variation between the actual oxygen content in the container and a preselected oxygen level desired to be present in the container.

10. A controlled atmosphere apparatus comprising:

a container having gases therein, the gases including nitrogen and oxygen;

a nitrogen generator connected to the container, the nitrogen generator controllably generating a stream of nitrogen to be injected into the container, the nitrogen stream having an oxygen component;

a sample analyzer subsystem connected to the container, the sample analyzer subsystem extracting a sample of gases from the controlled environment and analyzing an actual oxygen content in the extracted sample; and a controller coupled to the nitrogen generator and sample analyzer subsystem, the controller causing the nitrogen generator to change the amount of nitrogen being generated in response to variation between the oxygen component in the nitrogen stream and a reference amount of oxygen, the controller further changing the reference amount of oxygen used for controlling nitrogen generation in response to variation between the actual oxygen content in the container and a preselected oxygen level desired to be present in the container.

11. A controlled atmosphere apparatus according to claim 10 wherein the nitrogen generator comprises a nitrogen generating membrane.

12. A controlled atmosphere apparatus according to claim 10 wherein the nitrogen generator comprises:

a nitrogen generating membrane that generates a stream of high purity nitrogen with varying quantities of oxygen; and an oxygen sensor operably connected to the nitrogen generating membrane to sense the quantity of oxygen in the nitrogen stream.

13. A controlled atmosphere apparatus according to claim 10 wherein the nitrogen generator comprises:

an air intake subsystem which draws in air from external atmosphere to provide an air stream;

a nitrogen generating membrane connected to the air intake subsystem to receive the air stream, the nitrogen generating membrane outputting a stream of high purity nitrogen with varying quantities of oxygen;

an actuator operably connected to control flow rate of the air stream through the nitrogen generating membrane so that for a slower flow rate of the air stream therethrough, a higher purity nitrogen stream with a lower quantity of oxygen is output and for a faster flow rate of the air stream therethrough, a lower purity nitrogen stream with a higher quantity of oxygen is output; and an oxygen sensor operably connected to the nitrogen generating membrane to sense the quantity of oxygen in the nitrogen stream.

14. A controlled atmosphere apparatus according to claim 10 wherein the container comprises a portable container.

15. A controlled atmosphere apparatus according to claim 10 wherein the container comprises an environmentally sealed container.

16. A controlled atmosphere apparatus according to claim 10 wherein the container comprises a truck trailer.

* * * * *